United States Patent [19]
Lucarelli et al.

[11] Patent Number: 5,342,855
[45] Date of Patent: Aug. 30, 1994

[54] STABLE DISPERSIONS OF POLYHYDRAZODICARBONAMIDES USEFUL IN THE PREPARATION OF POLYURETHANE PRODUCTS HAVING IMPROVED LOAD-BEARING CAPACITY

[75] Inventors: Michael A. Lucarelli, New Martinsville, W. Va.; Richard E. Keegan, McMurray; Mark A. Koshute, Beaver, both of Pa.; Hans-Albrecht Freitag, Bergisch Gladbach; Geza Avar, Leverkusen, both of Fed. Rep. of Germany

[73] Assignee: Miles Inc., Pittsburgh, Pa.

[21] Appl. No.: 468,535

[22] Filed: Jan. 23, 1990

[51] Int. Cl.⁵ .................................... C08J 9/00
[52] U.S. Cl. ........................... 521/50; 521/99; 521/152; 521/167; 524/589; 524/590; 524/599; 524/612; 524/714
[58] Field of Search ............... 521/50, 167, 99, 152; 524/589, 590, 599, 612, 714

[56] References Cited

U.S. PATENT DOCUMENTS

| | | | |
|---|---|---|---|
| 3,325,421 | 6/1967 | Mueller | 252/308 |
| 4,042,537 | 8/1977 | Dahm et al. | 260/2.5 AP |
| 4,089,835 | 5/1978 | Koenig et al. | 260/31.6 |
| 4,092,275 | 5/1978 | Reischl et al. | 260/2.5 BD |
| 4,093,569 | 6/1978 | Reischl et al. | 260/2.5 AM |
| 4,119,613 | 10/1978 | Reischl et al. | 526/64 |
| 4,147,680 | 4/1979 | Reischl et al. | 260/29.2 TN |
| 4,184,990 | 1/1980 | Reischl et al. | 260/29.2 TN |
| 4,293,470 | 10/1981 | Cuscurida | 260/45.9 R |
| 4,305,857 | 12/1981 | Reischl | 260/29.2 TN |
| 4,305,858 | 12/1981 | Reischl | 260/29.2 TN |
| 4,310,448 | 1/1982 | Reischl | 260/29.6 R |
| 4,310,449 | 1/1982 | Reischl | 260/29.6 NR |
| 4,324,716 | 4/1982 | Reischl et al. | 524/761 |
| 4,374,207 | 2/1983 | Stone et al. | 521/107 |
| 4,477,602 | 10/1984 | Liang et al. | 521/137 |
| 4,496,678 | 1/1985 | Wenzel et al. | 524/157 |
| 4,569,952 | 2/1986 | Radovich et al. | 521/167 |
| 4,668,734 | 5/1987 | Dietrich et al. | 524/714 |
| 4,761,434 | 8/1988 | Dietrich et al. | 521/164 |
| 4,847,320 | 7/1989 | Lowery et al. | 524/722 |
| 4,855,352 | 8/1989 | Lowery et al. | 524/728 |

*Primary Examiner*—John Kight, III
*Assistant Examiner*—Duc Truong
*Attorney, Agent, or Firm*—Joseph C. Gil; Lyndanne M. Whalen; Godfried R. Akorli

[57] ABSTRACT

This invention relates to a process for the preparation of stable dispersions of hydroxyl-containing polyhydrazodicarbonamides in a hydroxyl-containing compound. The dispersions are prepared by the reaction of organic isocyanates, isocyanate-reactive compounds having a molecular weight in the range from 400 to 10,000, relatively low molecular weight isocyanate-reactive compounds, and hydrazines or hydrazides. This invention further relates to the dispersions prepared by said process, the use of the dispersions to prepare polyurethane foams having exceptional hardness, and the foams prepared thereby.

3 Claims, No Drawings

STABLE DISPERSIONS OF POLYHYDRAZODICARBONAMIDES USEFUL IN THE PREPARATION OF POLYURETHANE PRODUCTS HAVING IMPROVED LOAD-BEARING CAPACITY

BACKGROUND OF THE INVENTION

This invention relates to a process for preparing stable dispersions of hydroxyl-containing polyhydrazodicarbonamides ("PHD polyols") in a hydroxyl-containing compound wherein relatively low molecular weight chain extenders or crosslinkers are used in the preparation of the dispersion. This invention further relates to the dispersions prepared by said process. The dispersions of the invention are useful in the preparation of polyurethane foams having exceptional hardness.

Stable dispersions for use in manufacturing polyurethanes are known in the art. One particular family of such dispersions which has met with substantial commercial success are those polyureas and/or polyhydrazodicarbonamide dispersions prepared by reacting an organic polyisocyanate with polyamines containing primary and/or secondary amine groups, hydrazines, hydrazides, or a mixture thereof in the presence of hydroxyl-containing materials. See, e.g., U.S. Pat. Nos. 4,042,537, 4,089,835, and 4,324,716. Other patents describing this type of dispersion include U.S. Pat. Nos. 3,325,421, 4,092,275, 4,093,569, 4,119,613, 4,147,680, 4,184,990, 4,293,470, 4,305,857, 4,305,858, 4,310,448, 4,310,449, 4,496,678, 4,668,734, 4,761,434, and 4,847,320. While the commercially available dispersions are used to produce polyurethane products having excellent physical properties, it would be desirable if even further improvements could be realized.

The use of relatively low molecular weight isocyanate-reactive compounds as so-called chain extenders and crosslinking agents in the preparation of polyurethanes is, of course, well known. Certain low molecular weight glycol and polyol chain extenders and crosslinking agents have also been reported useful in the preparation of low viscosity liquid PHD polyol dispersions (for example, U.S. Pat. Nos. 4,089,835, 4,324,716, 4,847,320, and 4,855,352) that are suitable for use in commercial foaming equipment. In addition, U.S. Pat. No. 4,324,716 (columns 13 and 16) indicates that dispersions prepared using predominantly or exclusively low molecular weight polyols can be used as a substitute for the generally used chain extenders to obtain highly elastic transparent polyurethanes.

It is generally accepted that the reaction of polyisocyanates with hydrazines or hydrazides in the presence of hydroxyl-containing compounds involves the preferential reaction of isocyanate groups with $NH_2$ groups. According to U.S. Pat. No. 4,089,835 (column 2), the reaction of polyol hydroxyl groups also occurs and, in fact, may even be necessary to ensure the stability of the resultant dispersions. Because a given quantity of a low molecular weight polyol contains a larger number of hydroxyl groups than the same weight of a higher molecular weight polyol, the reaction of hydroxyl groups can presumably be enhanced by using greater proportions of the lower molecular weight polyol. Indeed, U.S. Pat. No. 4,089,835 (column 9) indicates that up to 60 percent by weight of the base polyol having a molecular weight above 500 can be replaced with lower molecular weight glycols and polyols, thereby producing liquid dispersions having low viscosities. As stated above, the advantage of low viscosity dispersions is their ease of use in available foaming equipment. These references, however, do not suggest that the use of low molecular weight polyols in preparing dispersions is in any way related to the physical properties of the foam products that are ultimately formed.

It has now surprisingly been found that the use of relatively small quantities of compounds containing at least two isocyanate-reactive hydrogen atoms and having a molecular weight in the range from about 32 to 700 gives rise to PHD polyol dispersions that are eminently useful for the preparation of urethane-based foams having exceptional load-bearing capacity. When compared to conventional foams made using the same quantity of low molecular weight isocyanate-reactive compounds as chain extenders or crosslinkers during the foaming process (rather than as components for preparing the dispersions), foams prepared according to the invention exhibit superior hardness.

The present invention is, therefore, directed to a novel process for producing stable dispersions, the dispersions produced by the process, and the use of such dispersions in the manufacture of polyurethane products having exceptional hardness.

SUMMARY OF THE INVENTION

This invention relates to a process for the preparation of stable dispersions of hydroxyl-containing polyhydrazodicarbonamides in a hydroxyl-containing compound comprising reacting (a) organic isocyanates;

(b) compounds containing at least two isocyanate-reactive hydrogen atoms and having a molecular weight in the range from about 400 to about 10,000;

(c) compounds containing at least two isocyanate-reactive hydrogen atoms and having a molecular weight in the range from 32 to about 700, wherein said compounds are different from compounds of component (b), in a quantity of from about 1 to about 8 (preferably 1 to 5) percent by weight based on the amount of component (b); and (d) hydrazines, hydrazides, or mixtures thereof;
wherein the ratio of the NCO equivalents of component (a) to the total amine equivalents is from 0.95 to 1.10.

This invention further relates to dispersions prepared by said process, the use of such dispersions to prepare polyurethane foams having exceptional hardness, and the foams prepared thereby.

DETAILED DESCRIPTION OF THE INVENTION

Suitable organic isocyanates (a) for the preparation of dispersions according to the invention include aliphatic, cycloaliphatic, araliphatic, aromatic and heterocyclic polyisocyanates of the type described, for example, by W. Siefken in *Justus Liebigs Annalen der Chemie*, 562, pages 75 to 136. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (see, e.g. German Auslegeschrift 1,202,785 and U.S. Pat. No. 3,401,190); 2,4- and 2,6-hexahydrotoluene diisocyanate and mixtures of these isomers; hexahydro-1,3- and/or -1,4-phenylene diisocyanate; perhydro-2,4'- and/or -4,4'-diphenylmethane diisocyanate ("HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane 4,4',4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, in German Patentschriften 1,022,789, 1,222,067 and 1,027,394, and in German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the aforementioned polyisocyanates. It is also possible to use mixtures of the polyisocyanates described above.

In general, the preferred polyisocyanates include 2,4- and 2,6-toluene diisocyanates and mixtures of these isomers ("TDI"); polyphenyl-polymethylene-polyisocyanates of the type obtained by condensing aniline with formaldehyde, followed by phosgenation ("crude MDI"); and polyisocyanates containing carbodiimide groups, allophanate groups, isocyanurate groups, urea groups or biuret groups ("modified polyisocyanates"). Particularly preferred polyisocyanates are 2,4- and 2,6-toluene diisocyanates and mixtures of these isomers, especially a mixture containing about 80 percent by weight 2,4-toluene diisocyanate and about 20 percent by weight 2,6-toluene diisocyanate.

Suitable isocyanate-reactive compounds (b) containing at least two isocyanate-reactive hydrogen atoms according to the invention include compounds containing hydroxyl groups, amino groups, thiol groups, carboxyl groups, or a combination thereof, the preferred compounds being those containing hydroxyl groups. Such compounds are described, for example, in German Offenlegungsschrift 2,832,253 at pages 11 to 20.

Particularly preferred isocyanate-reactive compounds (b) contain 2 to 8 (preferably 2 to 4) hydroxyl groups and have a molecular weight of from 400 to 10,000 (most preferably 3000 to 6000), including for example, hydroxyl-containing polyethers, polyesters, polyacetals, polycarbonates, polyesterethers, polythioethers, polyamides, polyesteramides, polysiloxanes, polybutadienes, and polyacetones, and can optionally contain one or more isocyanate-reactive amino groups. Suitable hydroxyl-containing compounds (preferably polyethers or polyesters) have average molecular weights in the range of about 400 to about 10,000 (preferably about 3000 to about 6000) and contain 2 to 6 reactive hydroxyl groups or, less preferably, 1 to 8 reactive hydroxyl groups and 1 to 4 reactive primary or secondary amino groups. Particularly preferred hydroxyl-containing compounds include polyethers having 2 to 6 (preferably 2) isocyanate-reactive hydroxyl groups.

Suitable hydroxyl-containing polyethers are known and may be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,3- or 1,2-propanediol, 1,2-, 1,3-, or 1,4-butanediol, trimethylolpropane, 4,4'-dihydroxydiphenylpropane, aniline, toluene diamines, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g. by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endo-methylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, cyclohexanedimethanol, 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolytic stability of the final product. Preferred polyesters include polyesters obtained from adipic acid or isophthalic acid and straight chained or branched diols, as well as lactone polyesters, preferably those based on caprolactone and diols.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diarylcarbonates such as diphenylcarbonate (German Auslegeschriften 1,694,080, 1,915,908, and 2,221,751; German Offenlegungsschrift 2,605,024).

Suitable polythioethers include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyesteramides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable isocyanate-reactive compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds modified with vinyl polymers, such as those obtained, for example, by the polymerization of styrene and acrylonitrile in the presence of polycarbonate polyols (German Patentschrift 1,769,795 and U.S. Pat. No. 3,637,909) are also suitable for the process of the invention. Synthetic resins with exceptional flame resistance may be obtained by using polyether polyols that have been modified by graft polymerization with vinyl phosphonic acid esters and optionally acrylonitrile, methacrylonitrile, acrylamide, methacrylamide, or hydroxy-functionalized acrylic or methacrylic acid esters according to German Offenlegungsschriften 2,442,101, 2,644,922, and 2,646,141.

Suitable, although less preferred, hydroxyl-containing compounds include organofunctional polysiloxanes containing two terminal isocyanate-reactive groups and structural units of the formula -O-Si(R)$_3$ in which R denotes a $C_1$–$C_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

Also suitable but less preferred are so-called amine terminated polyethers containing primary or secondary (preferably primary) aromatically or aliphatically (preferably aliphatically) bound amino groups. Compounds containing amino end groups can also be attached to the polyether chain through urethane or ester groups. These amine terminated polyethers can be prepared by any of several methods known in the art.

General discussions of representative hydroxyl-containing compounds that may be used according to the present invention can be found, for example, in *Polyurethanes, Chemistry and Technology* by Saunders and Frisch, Interscience Publishers, New York, London, Volume I, 1962, pages 32–42 and pages 44–54, and Volume II, 1964, pages 5–6 and 198–199, and in *Kunststoff-Handbuch,* Volume VII, Vieweg-Höchtlen, Carl-Hanser-Verlag, Munich, 1966, on pages 45 to 71.

Suitable isocyanate-reactive compounds (c) containing at least two isocyanate-reactive hydrogen atoms according to the invention include compounds containing hydroxyl groups, amino groups, thiol groups, carboxyl groups, or a combination thereof, the preferred compounds being those containing hydroxyl groups.

Preferred hydroxyl-containing compounds (c) include glycols and polyols having average molecular weights in the range of about 32 to about 700, such as 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-1,3-propanediol, 2-methyl-1,3-propanediol, glycerol, trimethylolpropane, 1,2,6-hexanetriol, 1,2,4-butanetriol, and trimethylolethane, as well as polyethers, polyesters, polyacetals, polycarbonates, polyesterethers, polythioethers, polyamides, polyesteramides, polysiloxanes, polybutadienes, and polyacetones. Polyols suitable for use as component (c) can be prepared by the general methods used to prepare the higher molecular weight polyols of component (b) described above or by other methods known in the art. Particularly preferred hydroxyl-containing compounds (c) include polyethers or polyesters having 2 to 6 (preferably 2) isocyanate-reactive hydroxyl groups.

When the less-preferred amine-containing isocyanate-reactive compounds are used as component (c), such compounds preferably include aliphatic compounds containing both hydroxy and amino groups, such as ethanolamine, diethanolamine, triethanolamine, and the like.

Although less preferred, it is also possible to use as component (c) compounds containing aromatically bound primary or secondary (preferably primary) amino groups and, preferably, also containing alkyl substituents. Examples of such diamines include 1,4-diaminobenzene, 2,4-diaminotoluene, 2,4'- and/or 4,4'-diaminodiphenylmethane, 3,3'-dimethyl-4,4'-diaminodiphenylmethane, 1-methyl-3,5-bis(methylthio)-2,4- and/or-2,6-diaminobenzene, 1,3,5-triethyl-2,4-diaminobenzene, 1,3,5-triisopropyl-2,4-diaminobenzene, 1-methyl- 3,5-diethyl-2,4- and/or -2,6-diaminobenzene, 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4-diaminodiphenylmethane. Such diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene.

Components (b) and (c) of the invention are described in terms of molecular weight, which can be determined directly by methods known in the art or calculated from experimentally determined hydroxyl numbers (and/or similarly determined amine numbers) using the well-known relationship described by the formula $$\text{molecular weight} = \frac{56.100 \times \text{functionality}}{\text{hydroxyl (or amine) number}}.$$

Component (d) comprises suitable hydrazines and hydrazides, Suitable hydrazines include unsubstituted hydrazine and mono- or N,N'-disubstituted hydrazines in which the substituents are, for example, $C_1$–$C_6$ alkyl groups, cyclohexyl groups, or phenyl groups. The hydrazines generally have a molecular weight of from 32 to 500. It is generally preferred to use unsubstituted hydrazine itself. Examples of suitable hydrazines include hydrazine (and hydrazine hydrate), methylhydrazine, ethylhydrazine, propylhydrazine, isopropylhydrazine, butylhydrazine, isobutylhydrazine, tert-butylhydrazine, butenylhydrazine, dodecylhydrazine, phenylhydrazine, tolylhydrazine, benzylhydrazine, 2-phenylethylhydrazine, cyclohexylhydrazine, cyclopentylhydrazine, $\beta$-cyanoethylhydrazine, 1,2-dimethylhydrazine, 1,2-diethylhydrazine, 1,2-diisobutylhydrazine, 1-butyl-2-methylhydrazine, hydrazobenzene, 1-benzyl-2-phenylhydrazine, 1-aminopiperazine, and 1,4-diaminopiperazine.

Suitable hydrazides include the hydrazides of divalent or higher polyvalent carboxylic acids, such as carbonic acid, oxalic acid, malonic acid, succinic acid, adipic acid, sebacic acid, azelaic acid, maleic acid, fumaric acid, phthalic acid, isophthalic acid, and terephthalic acid; the esters of hydrazinomonocarboxylic acids with dihydric or higher polyhydric alcohols and phenols, such as ethanediol, 1,2-propanediol, 1,2-butanediol, 1,3-butanediol, 1,4-butanediol, hexanediol, diethyleneglycol, triethylene glycol, tetraethylene glycol, dipropylene glycol, tripropylene glycol, and hydroquinone; and the amides of hydrazinomonocarboxylic acid (semicarbazides) with various diamines and polyamines known in the art. Sulfur and nitrogen analogs of these hydrazides are also suitable. These hydrazides generally have molecular weights of from 90 to 10,000 (preferably from 90 to 3000 and most preferably from 90 to 1000). Examples of suitable hydrazides and analogs include oxalyl dihydrazide, semicarbazide, carbohydrazide, 4-methylsemicarbazide, 4-phenylsemicarbazide, isophthalic acid dihydrazide, $\beta$-hydrazinopropionic acid hydrazide, thiosemicarbazide, thiocarbohydrazide, and aminoguanidine.

The above-mentioned hydrazines and hydrazides may be used in the form of their standard commercial-grade aqueous solutions.

In general, the reaction components used to prepare the dispersion of the invention are introduced at room temperature into a flow mixer of the type generally known in the art. If desired, the isocyanate-reactive material may be introduced at a slightly elevated temperature (for example, 40° C. to 50° C.) to reduce the viscosity for ease of pumping and for more efficient mixing. The reaction temperature may rise to from 50° C. to about 150° C. under the effect of the shear forces generated when a dynamic mixer is used and under the effect of the heat generated by the polyaddition reaction (depending upon the quantity of resinous solids). In general, however, it is best to keep the temperature below about 110° C. (optionally by cooling the mixer) because at higher temperatures any water which may be present can evaporate and give rise to undesirable bubble formation. When hydrazine is used, it is also important to ensure that the decomposition temperature of hydrazine is not exceeded.

The polyaddition reaction of polyisocyanates with hydrazines and/or hydrazides can be carried out in higher performance continuous flow mixers with average residence times of from about 1 second up to 10 minutes, preferably from 2 seconds to 3 minutes. The homogenization or dispersion time should not exceed 10% of the average residence time if thorough admixture of the components is to be obtained. It is possible, although not essential, to arrange two or even more flow mixers one behind the other. The times given above then apply to the mixer system as a whole.

Flow mixers are known and belong to either of two groups, namely static mixers with fixed fittings and dynamic mixers with movable fittings operating on the rotor-stator principle. The mixers may optionally be heated or cooled. When using static mixers, the mixing energy required is applied through pumps, whereas with dynamic mixers, a separate motor drives the rotor. The dispersing effect and the particle size in the dispersion are governed by the energy applied, the shear forces correspondingly generated, and the catalysts present.

Suitable static mixers include (a) mixers with simple fittings (for example, U.S. Pat. Nos. 3,286,992 and 3,704,006 and German Offenlegungsschrift 2,119,293); (b) multi-channel mixers (for example, the AMK-Ross-ISG Mixers manufactured by Aachener Misch- und Knetmaschinen-Fabrik, West Germany); (c) so-called packing mixers (for example, the static mixers manufactured by Sulzer AG, Winterthur, Switzerland and the BKM-Mixers manufactured by Bayer AG, West Germany) (for example, U.S. Pat. Nos. 3,785,620 and 4,062,524); and (d) mixing nozzles (for example, those manufactured by the Lechler Company, Stuttgart, West Germany) and mixing chambers into which the starting products are injected under high pressure ("counter-current injection") (for example, in HK-machines manufactured by the Hennecke Company, Birlinghofen, West Germany).

Suitable dynamic mixers include the flow mixers manufactured by the companies Ekato RMT (Schopfheim, West Germany), Lightnin (Neu-Isenburg, West Germany) and Hennecke (toothed stirrer) which, like the known impeller-type homogenizing machines, operate on the stator-rotor principle but cannot be used to perform feed or delivery functions.

The energy required to produce the dispersions of the present invention is generally from about 1 to more than about 10 kW per liter of mixer volume. The amount of energy is however dependent upon the required particle size, the type of mixer used, and the viscosity of the starting materials.

When anhydrous hydrazines and/or hydrazides are used, no further treatment of the dispersion on completion of the polyaddition reactions is needed. However, when aqueous hydrazines and/or hydrazides (for example, hydrazine hydrate) are used, it may be advisable to remove the water from the dispersion in vacuo.

In general, the process for preparing the dispersions of the present invention is carried out by introducing the components from separate supply vessels through metering pumps into a flow mixer in which they are thoroughly mixed and in which, at the same time, most of the polyaddition reaction takes place. It is also possible, however, to combine various components before mixing. In a preferred method, the isocyanate component (a) is mixed in a first mixer with a portion of the isocyanate-reactive component (b) (often referred to as the "base polyol"), and the hydrazine and/or hydrazide component (d) is mixed in a second mixer with an additional portion of the isocyanate-reactive component (b). The resultant mixtures are introduced as separate streams into a third mixer into which is introduced a separate stream of the low molecular weight isocyanate-reactive component (c). Component (c) can be either injected into the mixer as a separate stream or can be blended with yet another portion of the isocyanate-reactive component (b) before mixing. When aqueous hydrazines and/or hydrazides are used, the dispersions may be freed in vacuo from the water present in them.

The dispersions produced according to the invention may be used to prepare polyurethane foams having excellent hardness properties. In contrast, foams made using the same quantity of low molecular weight isocyanate-reactive compounds as chain extenders or crosslinkers for the foaming process rather than for the preparation of the dispersions are inferior when compared to foams prepared according to the invention.

Polyurethane products from the dispersions can be made in substantially any manner known in the art. The polyurethane-forming reaction components (that is, the dispersions of the present invention, an isocyanate, and any other materials such as catalysts, blowing agents, and other additives and auxiliaries) may be reacted by the known one-stage process, by the prepolymer process, or by the semiprepolymer process. Machines, such as those described in U.S. Pat. No. 2,764,565, may be used in many of these processes. Particulars of the processing machines which may also be used to produce polyurethanes according to the invention may be found in Kunststoff-Handbuch, Vol. VII, Vieweg and Hochtlen, Carl-Hanser-Verlag, Munich 1966, pages 121 to 205. Although low molecular weight isocyanate-reactive compounds can theoretically be used in preparing foams, such compounds are preferably not used to make foams according to the invention. Foams produced from the dispersions of the present invention may be produced by introducing the reaction mixture into a mold. Suitable mold materials include metals (for example, aluminum) or plastics (for example, epoxide resin). In the mold, the foamable reaction mixture foams to form the molded product. In-mold foaming may be carried out in such a way that the molding has a compact skin and a cellular core. It is possible to introduce into the mold a quantity of foamable reaction mixture such that the foam formed just fills the mold. It is also possible to introduce into the mold more foamable reaction mixture than is required to fill the interior of the mold with foam, technique known as "over-charging" and described, for example, in U.S. Pat. Nos. 3,178,490 and 3,182,104.

External release agents, such as silicone oils, are often used during in-mold foaming. It is, however, also possible to use so-called "internal release agents", optionally in admixture with external release agents, as described, for example, in German Offenlegungsschriften 2,121,670 and 2,307,589.

Cold-hardening foams may also be produced in accordance with the invention (See British Patent 1,162,517 and German Offenlegungsschrift 2,153,086).

It is further possible to produce foams by block foaming or by the known double conveyor belt process.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts and percentages by weight.

DESCRIPTION OF THE PREFERRED EMBODIMENTS

Dispersions and foams were prepared by the following general procedures.

Dispersions. The dispersions of the invention and the comparison dispersion are prepared as described in the following examples. The base polyol is a glycerol-started polyether of propylene oxide and ethylene oxide (83 wt. % propylene oxide and 17 wt. % ethylene oxide) having a hydroxyl number of 35 and a primary OH content of approximately 80% based on the total OH content of the polyether polyol.

The following low molecular weight polyols (chain extenders or crosslinkers) are used to form the dispersions in the preliminary reaction with the isocyanate starting material.

(i) glycerol (hydroxyl number 1829; molecular weight 92)

(ii) glycerol-started polyether of propylene oxide having a hydroxyl number of 1050 (average molecular weight 160)

(iii) propylene glycol-started polyether of propylene oxide having a hydroxyl number of 264 (average molecular weight 425)

(iv) diethylene glycol-started polyether of ethylene oxide having a hydroxyl number of 561 (average molecular weight 200)

(v) ethylene diamine-started polyether of propylene oxide having a hydroxyl number of 630 (average molecular weight 356)

(vi) crude toluene diamine-started polyether of propylene oxide and ethylene oxide (56.6 wt. % propylene oxide and 43.4 wt. % ethylene oxide) having a hydroxyl number of 465 (average molecular weight 483)

(vii) diethylene glycol-started polyether of propylene oxide having a hydroxyl number of 495 (average molecular weight 305)

(viii) diethanolamine (hydroxyl number 1603; molecular weight 105)

Foams. Polyurethane foams are prepared using the following components in the quantities indicated in the table below:

A: Polyol dispersions (prepared as described in the examples)

B: Glycerol-started polyether of propylene oxide and ethylene oxide (83 wt. % propylene oxide and 17 wt. % ethylene oxide) having a hydroxyl number of 35 and a primary OH content of approximately 80% based on the total OH content of the polyether polyol C: Water (total)

D: Triethylene diamine, a tertiary amine catalyst available as Dabco 33LV from Air Products, Inc.

E: A formate salt of bis[2-dimethylamino)ethyl] ether, Niax A-107 tertiary amine catalyst available from Union Carbide Corp.

F. A solution of diethanolamine (85%) in water (15%), DEOA-LF crosslinking/curing agent available from Union Carbide Corp.

G: Dimethylpolysiloxane polyalkylene oxide copolymer, DC-5043 foam stabilizer available from Dow Corning Corp.

H: Dialkyltinmercaptide, UL-1 catalyst available from Witco Chemical Corp.

I: Low molecular weight polyol (the same as used in preparing polyol dispersions of the invention but added as a separate component during formation of comparison foams)

J: An 80/20 weight ratio mixture of 2,4- and 2,6-toluene diisocyanate isomers, available as MONDUR TD-80 from Mobay Corp.

|           | Isocyanate-Reactive Formulation |       |            |       |
|-----------|---------|---------|----------|---------|
|           | Invention |       | Comparison |       |
|           | (a)     | (b)     | (c)      | (d)     |
| Component | (parts by wt.) | | | |
| A | 40 | 80 | 40 | 80 |
| B | 60 | 20 | 60 | 20 |
| C | 3.5 | 3.5 | 3.5 | 3.5 |
| D | 0.6 | 0.6 | 0.6 | 0.6 |
| E | 0.4 | 0.4 | 0.4 | 0.4 |
| F | 2.35 | 2.35 | 2.35 | 2.35 |
| G | 1.75 | 2.0 | 1.75 | 2.0 |
| H | — | 0.005 | — | 0.005 |
| I | 0 | 0 | ≦1.28 | ≦2.56 |

Foams were prepared using either 40 or 80 parts by weight of the dispersions by pre-mixing components A through I. Component J was then added to the pre-mix according to the isocyanate (NCO) index listed in each example (generally 100, occasionally 105). The reacting mixture was dispensed by hand or using machines into an aluminum mold that had been heated to a temperature of between 140° F. and 150° F. (about 62° C. to 66° C.). The reacting mixture foamed to fill the mold, at which time the mold was placed in an oven at 250° F. (about 121° C.). After three minutes, the finished foam was removed from the mold and physically crushed to ensure that all cells were opened. The foams were postcured at 250° F. (about 121° C.) for 30 minutes and at room temperature for seven days before hardness testing (ILD, 50R) was begun.

EXAMPLES

Example 1: Comparison Dispersion

Toluene diisocyanate ("TDI")(80 wt. % 2,4-isomer and 20 wt. % 2,6-isomer) (845 g/min stream) is mixed in a static mixer with the base polyol (2640 g/min stream) having a hydroxyl number of 35. Hydrazine hydrate (64% by weight hydrazine) (243 g/min stream) is admixed with the same base polyol (1360 g/min stream) in a separate static mixer. The two streams are introduced into another mixing device (pin mixer) where they are allowed to react at a urea index of 100. After a short post-reaction period, water is removed. The dispersion produced by this procedure has a solids content of 20 wt. %, a hydroxyl number of 28, and a viscosity of 3500 mPa.s.

Example 2: Comparison Polyurethane

The comparison dispersion according to Example 1 is used to prepare polyurethane foams at the isocyanate indexes shown using no low molecular weight polyol component I in the foaming step. The foams have the following properties. Hardness (ILD, Newtons per 323 $cm^2$):

Handmix (NCO index 100, 40 pbw dispersion): 200
Handmix (NCO index 100, 80 pbw dispersion): 254
Machine (NCO index 100, 40 pbw dispersion): 170
Machine (NCO index 100, 80 pbw dispersion): 217
Machine (NCO index 105, 80 pbw dispersion): 248

Examples 3 to 27

Polyol compositions according to the invention are prepared as described in Example 1 except that a low molecular weight polyol (selected from the group described above) is introduced as a separate stream into the third mixing device described in Example 1. The low molecular weight polyol is either blended with the base polyol before mixing ("blend") or injected into the mixer as a separate stream ("inject"). The quantity of the low molecular weight polyol is selected to be a specific weight percentage of all of the polyols used in making the dispersion. The "solids content" for each dispersion is related to the quantity of the reactive components used to prepare the dispersion and is, in essence, that fraction of the weight of the dispersion that is not derived from the polyol components (normally expressed as a percent by weight of the total dispersion). Hydroxyl numbers and viscosities of the polyol compositions of the invention are given in the Tables.

The materials produced by this procedure are used without further workup in the preparation of polyurethane foams according to the invention. Foaming is carried out either by hand mixing or using machines, as indicated in the tables. ILD values of the product foams are given in the Tables.

Comparison experiments were conducted by omitting the low molecular weight polyol during the preparation of the dispersion. The same quantity of the low molecular weight polyol used in making the dispersions of the invention is added as foaming component I during preparation of the comparison foams. The quantity of component I used to make the comparison foams (listed in the Tables as parts per 100 parts of total polyol used in the foam) is calculated in the following manner. First, the quantity of low molecular weight polyol contained in the corresponding dispersion of the invention, which is listed in the Tables as weight percent of all of the polyols used in making the dispersion, is converted to weight percent of the dispersion as a whole. For example, the percent by weight of the dispersion can be calculated by multiplying the weight percent based on the polyols by the difference, divided by 100, between 100% and the percent solids content of the dispersion. Next, the quantity of low molecular weight polyol, expressed as weight percent of the dispersion, is multiplied by the fractional part of the total polyols derived from the dispersion (i.e., 40% or 80%), giving the quantity of component I to be used in the comparison foams. Comparison ILD values ("ILD (comp)") are listed in the Tables. Examples 18, 19, and 27 are also comparison examples.

index of 110. The dispersions thus formed are used to prepare polyurethane foams having the properties shown in Table 2.

TABLE 2

| Examples | 13a | 13b | 14a[1] | 14b[1] | 14c[1] | 15a | 15b | 15c | 16[20] | 17[1] |
|---|---|---|---|---|---|---|---|---|---|---|
| Dispersions |  |  |  |  |  |  |  |  |  |  |
| Low MW polyol | (iv) | (iv) | (iv) | (iv) | (iv) | (iv) | (iv) | (iv) | (iv) | (iv) |
| Quantity (as wt. % of polyols) | 2 | 2 | 2 | 2 | 2 | 4 | 4 | 4 | 4 | 4 |
| Addition method | inject | inject | inject | inject | inject | inject | inject | inject | inject | inject |
| Hydroxyl number | 36.4 | 36.4 | 36.4 | 36.4 | 36.4 | 44.8 | 44.8 | 44.8 | 44.8 | 44.8 |
| Viscosity (mPa.s) | 8750 | 8750 | 5850 | 5850 | 5850 | 3180 | 3180 | 3180 | 3180 | 3960 |
| Foams of invention |  |  |  |  |  |  |  |  |  |  |
| NCO index | 100 | 105 | 100 | 100 | 105 | 100 | 100 | 105 | 100 | 100 |
| Formulation | (b) | (b) | (b) | (b) | (b) | (b) | (b) | (b) | (b) | (b) |
| Foaming method | machine | machine | machine | handmix | machine | machine | handmix | machine | handmix | handmix |
| ILD | 250 | 282 | 238 | 262 | 256 | 267 | 314 | 295 | 284 | 276 |

[1]The dispersions of Examples 14a, 14b, 14c, and 17 were prepared in the same manner at those of Examples 13a and 13b except for using 500 ppm (based on the base polyol) of Niax A-1 amine catlyst (available from Union Carbide).
[2]The dispersion used in Example 16 was the same as that used in Examples 15a, 15b, and 15c except for having 6% total water before the water was removed.

Examples 3 to 12

The polyol compositions used in Examples 3-12 are prepared with a solids content of 20 wt. % and a urea index (i.e., the ratio, multiplied by 100, of NCO equivalents to amine equivalents) of 100. The dispersions thus formed are used to prepare polyurethane foams having the properties shown in Table 1.

Examples 18 to 25

The polyol compositions used in Examples 18-25 are prepared with a solids content of 28 wt. % and a urea index of 100. A throughput rate of approximately 3000-5000 grams per minute is considered high. The dispersions thus formed are used to prepare polyure-

TABLE 1

| Examples: | 3 | 4 | 5 | 6 | 7 | 8 | 9 | 10a | 10b |
|---|---|---|---|---|---|---|---|---|---|
| Dispersions |  |  |  |  |  |  |  |  |  |
| Low MW polyol | (i) | (ii) | (iii) | (iv) | (v) | (vi) | (vii) | (viii) | (viii) |
| Quantity (as wt. % of polyols) | 2 | 2 | 2 | 2 | 2 | 2 | 2 | 1 | 1 |
| Addition method | blend | blend | blend | blend | blend | blend | blend | inject | inject |
| Hydroxyl number | 56.7 | 44.2 | 31.7 | 36.4 | 37.5 | 34.9 | 35.4 | 40.6 | 40.6 |
| Viscosity (mPa.s) | 3200 | 4160 | 3318 | 3090 | 3240 | 3230 | 3840 | 3330 | 3330 |
| Foams of invention |  |  |  |  |  |  |  |  |  |
| NCO index | 100 | 100 | 100 | 100 | 100 | 100 | 100 | 100 | 100 |
| Formulation | (b) | (b) | (b) | (b) | (b) | (b) | (b) | (b) | (a) |
| Foaming method | handmix | handmix | handmix | handmix | handmix | handmix | handmix | handmix | handmix |
| ILD | 348 | 311 | 272 | 314 | 288 | 287 | 306 | 295 | 224 |
| Comparison foams |  |  |  |  |  |  |  |  |  |
| Comp. formulation | (d) | (d) | (d) | (d) | (d) | — | (d) | — | — |
| Component I (as parts/100 parts total polyol) | 1.28 | 1.28 | 1.28 | 1.28 | 1.28 | — | 1.28 | — | — |
| ILD (comp) | 279 | 272 | 249 | 240 | 246 | — | 297 | — | — |

| Examples: | 11a | 11b | 11c | 11d | 11e | 12a[1] | 12b[1] |
|---|---|---|---|---|---|---|---|
| Dispersions |  |  |  |  |  |  |  |
| Low MW polyol | (viii) | (viii) | (viii) | (viii) | (viii) | (viii) | (viii) |
| Quantity (as wt. % of polyols) | 2 | 2 | 2 | 2 | 2 | 2 | 2 |
| Addition method | inject | inject | inject | inject | inject | inject | inject |
| Hydroxyl number | 53.1 | 53.1 | 53.1 | 53.1 | 53.1 | 53.1 | 53.1 |
| Viscosity (mPa.s) | 3280 | 3280 | 3280 | 3280 | 3280 | 3220 | 3220 |
| Foams of invention |  |  |  |  |  |  |  |
| NCO index | 100 | 100 | 100 | 100 | 105 | 100 | 100 |
| Formulation | (b) | (a) | (b) | (a) | (b) | (b) | (a) |
| Foaming method | handmix | handmix | machine | machine | machine | handmix | handmix |
| ILD | 310 | 219 | 267 | 193 | 295 | 345 | 252 |

[1]The foams of Examples 12a and 12b were prepared using 100 ppm (based on the base polyol) of dibutyltin dilaurate as catalyst.

Examples 13 to 17

The polyol compositions used in Examples 13-17 are prepared with a solids content of 20 wt. % and a urea thane foams having the properties shown in Table 3.

TABLE 3

| | Comparison[1] | | Invention | | | | | |
|---|---|---|---|---|---|---|---|---|
| Examples | 18 | 19 | 20 | 21 | 22 | 23 | 24 | 25 |
| Dispersion |  |  |  |  |  |  |  |  |
| Low MW polyol | — | — | (v) | (ii) | (iv) | (iv) | (iv) | (iv) |

TABLE 3-continued

| Examples | Comparison[1] 18 | 19 | Invention 20 | 21 | 22 | 23 | 24 | 25 |
|---|---|---|---|---|---|---|---|---|
| Quantity (as wt. % of polyols) | 0 | 0 | 3 | 3 | 3 | 3 | 4 | 2 |
| Addition method | blend | — | blend | blend | blend | blend | blend | blend |
| Throughput rate | — | high | high | high | high | low | low | low |
| Hydroxyl number | 25.2 | — | 38.1 | 47.2 | 36.6 | 36.6 | 40.3 | 32.8 |
| Viscosity (mPa.s) | 7000 | 45097 | 11200 | 24100 | 16420 | 7870 | 7870 | 7800 |
| Foams of invention | | | | | | | | |
| NCO index | 100 | — | 100 | 100 | 100 | 100 | 100 | 100 |
| Formulation | (b) | — | (b) | (b) | (b) | (b) | (b) | (b) |
| ILD | 359 | — | 404 | 372 | 371 | 405 | 421 | 362 |
| Comparison foams | | | | | | | | |
| Comp. formulation | — | — | — | — | (d) | (d) | (d) | — |
| Component I (as parts/100 parts total polyol) | — | — | — | — | 1.73 | 1.73 | 2.30 | — |
| ILD (comp) | — | — | — | — | 332 | 263 | 336 | — |

[1]The comparison foams of Examples 18 and 19 were prepared without using the low molecular weight polyols. The composition of Example 19, which was prepared like that of Example 18 except for a higher throughput rate, could not be foamed.

Examples 26 to 27

The polyol compositions used in Examples 26 and 27 are prepared with a solids content of 35 wt. % and a urea index of 100. The dispersion thus formed are used to prepare polyurethane foams having the properties shown in Table 4. Example 27 is a comparison example in which both the dispersion and the foam were prepared without using a low molecular weight polyol. In this comparison test, the high solids dispersion of the invention provides a foam product having only marginally enhanced hardness properties relative to the comparison foam. Nevertheless, the dispersion of the invention has the advantage of having a significantly lower viscosity than does the comparison dispersion.

TABLE 4

| Examples: | 26 | 27 |
|---|---|---|
| Dispersions | | |
| Low MW polyol | (viii) | — |
| Quantity (as wt. % of polyols) | 2 | 0 |
| Addition method | inject | — |
| Throughput rate | low | low |
| Hydroxyl number | 43.1 | 22.8 |
| Viscosity (mPa.s) | 14800 | 32400 |
| Foams | | |
| NCO index | 100 | 100 |
| Formulation | (a) | (a) |
| ILD | 270 | 284 |

What is claimed is:

1. A polyurethane foam prepared by a process comprising reacting
    (A) an organic isocyanate;
    (B) a dispersion of a hydroxyl-containing polyhydrazodicarbonamide in a hydroxyl-group-containing compound comprising the reaction product of
        (a) an organic isocyanate;
        (b) a compound containing at least two isocyanate-reactive hydrogen atoms and having a molecular weight in the range from 400 to 10,000;
        (c) a compound containing at least two isocyanate-reactive hydrogen atoms and having a molecular weight in the range from 32 to 700, wherein said compound is different from the compound of component (b), in a quantity of from 1 to 8 percent by weight based on the amount of component (b); and
        (d) a hydrazine, a hydrazide, or a mixture thereof; wherein the ratio of the NCO equivalents of component (a) to the total amine equivalents of the dispersion is from 0.95 to 1.10.

2. A polyurethane foam according to claim 1 prepared by a process comprising reacting
    (A) an organic isocyanate;
    (B) a dispersion of a hydroxyl-containing polyhydrazodicarbonamide in a hydroxyl-group-containing compound comprising the reaction product of
        (a) a toluene diisocyanate;
        (b) a polyether polyol or a polyester polyol having 2 to 6 isocyanate-reactive hydroxyl groups and having a molecular weight in the range from 400 to 10,000;
        (c) a compound having a molecular weight in the range from 32 to 700 selected from the group consisting of (i) a glycol, (ii) a polyether or polyester having 2 to 6 isocyanate-reactive hydroxyl groups, (iii) diethanolamine, and (iv) triethanolamine, wherein said compound is different from the compound of component (b), in a quantity of from 1 to 5 percent by weight based on the amount of component (b); and
        (d) a hydrazine, a hydrazide, or a mixture thereof; wherein the ratio of the NCO equivalents of component (a) to the total amine equivalents of the dispersion is from 0.95 to 1.10.

3. An improved process for preparing a polyurethane foam comprising reacting
    (A) an organic isocyanate;
    (B) a dispersion of a hydroxyl-containing polyhydrazodicarbonamide in a hydroxyl-containing compound prepared by reacting (a) an organic isocyanate with a compound containing isocyanate reactive hydrogens selected from the group consisting of (b) a compound containing at least two isocyanate-reactive hydrogen atoms having molecular weight in the range from 400 to 10,000; (c) a hydrazine, a hydrazide or a mixture thereof wherein the NCO equivalents of component a) to the total amine equivalents is from 0.95 to 1.10, the improvement comprising the compound containing isocyanate-reactive hydrogen which further comprises (d) a compound containing at least two isocyanate-reactive hydrogen atoms and having a molecular weight in the range of 32 to 700 wherein this compound is different from the compound (b) and is present in a quantity of from 1 to 8 percent by weight based on the amount of component (b).

* * * * *